United States Patent
Sneider et al.

(10) Patent No.: US 11,763,293 B2
(45) Date of Patent: Sep. 19, 2023

(54) COMPUTER-BASED SYSTEMS INVOLVING TEMPORARY CARDS AND ASSOCIATED SERVER AND/OR MOBILE DEVICE FEATURES AND METHODS OF USE THEREOF

(71) Applicant: Capital One Services, LLC, McLean, VA (US)

(72) Inventors: Amanda Sneider, McLean, VA (US); Bernard Prat, McLean, VA (US); Kaichao Sun, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 113 days.

(21) Appl. No.: 17/086,250

(22) Filed: Oct. 30, 2020

(65) Prior Publication Data

US 2022/0138725 A1  May 5, 2022

(51) Int. Cl.
  *G06Q 20/34* (2012.01)
  *G06Q 20/40* (2012.01)
  *G06F 3/04847* (2022.01)
  *G06K 19/077* (2006.01)

(52) U.S. Cl.
  CPC ........ *G06Q 20/354* (2013.01); *G06F 3/04847* (2013.01); *G06K 19/07733* (2013.01); *G06Q 20/351* (2013.01); *G06Q 20/405* (2013.01)

(58) Field of Classification Search
  CPC .............. G06Q 20/354; G06Q 20/405
  USPC ........................................... 705/41
  See application file for complete search history.

(56) References Cited

U.S. PATENT DOCUMENTS

| | | |
|---|---|---|
| 6,705,518 B2 | 3/2004 | Park et al. |
| 8,548,926 B2 | 10/2013 | Balistierri et al. |
| 10,185,953 B2 | 1/2019 | Shenoy et al. |
| 10,504,196 B2 | 12/2019 | Feinberg et al. |
| 10,748,155 B1 * | 8/2020 | Walters .............. G06Q 20/4016 |
| 10,872,345 B1 * | 12/2020 | Walters ................ G06Q 20/202 |
| 2002/0174016 A1 | 11/2002 | Cuervo |

(Continued)

FOREIGN PATENT DOCUMENTS

| | | |
|---|---|---|
| JP | 1999143968 A | 5/1999 |
| JP | 2007128473 A | 5/2007 |

OTHER PUBLICATIONS

Notification of ISR and Written Opinion, including International Search Report (3 pgs) and Written Opinion (6 pgs), dated Feb. 3, 2022; 10 pages total.

*Primary Examiner* — Lindsay M Maguire
(74) *Attorney, Agent, or Firm* — Greenberg Traurig, LLP

(57) ABSTRACT

Systems and methods involving a temporary card as well as features and functionality of an associated server and/or application resident on a computing device are disclosed. In one embodiment, an exemplary system may comprise a temporary card provided to a user to conduct purchase transactions for a period of temporary use as well as a server configured to manage operation of the temporary card and execute instructions causing the server to: communicate with an app resident on a computing device associated with the user, instruct the app to generate one or more graphical user interfaces (GUIs) configured to display first interactive GUI elements with first user-selection(s) and second interactive GUI elements with second user-selection(s), and/or control the temporary card based on the first and second user-selections.

20 Claims, 8 Drawing Sheets

(56) References Cited

U.S. PATENT DOCUMENTS

| | | |
|---|---|---|
| 2007/0114274 A1 | 5/2007 | Gibbs et al. |
| 2011/0302084 A1 | 12/2011 | Melik-Aslania |
| 2012/0047075 A1 | 2/2012 | Balistierr et al. |
| 2013/0075469 A1 | 3/2013 | Stochita |
| 2013/0159186 A1 | 6/2013 | Brudnicki et al. |
| 2016/0189123 A1 | 6/2016 | Lucia Specogna et al. |
| 2018/0018669 A1 | 1/2018 | Goldberg et al. |
| 2020/0387973 A1* | 12/2020 | Blankinship ......... G06Q 20/204 |
| 2021/0182853 A1* | 6/2021 | Camenares .......... G06Q 20/341 |
| 2021/0326824 A1* | 10/2021 | Bartholomew ...... G06Q 20/409 |

\* cited by examiner

COMPUTER-BASED SYSTEMS INVOLVING TEMPORARY CARDS AND ASSOCIATED SERVER AND/OR MOBILE DEVICE FEATURES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved temporary cards, improved computer-based platforms or systems, improved computing components and devices and/or improved computing methods configured for one or more novel technological applications involving temporary cards, associated servers and/or mobile devices.

BACKGROUND OF TECHNOLOGY

Temporary cards and associated computer components, systems, networks and platforms may involve processing via a group of computers and/or other computing hardware devices that are linked and communicate via one or more networks, communication components, electrical subcomponents, and/or software applications associated with temporary cards, electronic interactions, data processing, and/or mobile computing devices.

OVERVIEW OF DESCRIBED SUBJECT MATTER

In some embodiments, the present disclosure provides various exemplary technically improved system for providing and managing temporary cards, the system comprising elements such as:

a temporary card provided to a user to conduct at least one activity requiring a presentation of the temporary card, the temporary card configured to be active for a period of a temporary use during a pre-defined time period; and a server configured to manage operation of the temporary card, and comprising non-transient computer readable media storing instructions that, when executed by at least one processor of the server, cause the server to:

communicate with an app resident on a computing device associated with the user;

instruct the app to generate one or more graphical user interfaces (GUIs) configured to display:

first interactive GUI elements, allowing a first user-selection of first criteria including: the time period of approved use and at least one location or geographic region of approved use; and second interactive GUI elements, allowing a second user-selection of second criteria related to one or more of:

i) an approval of a use of the temporary card,
ii) an approval or operation of the temporary card,
iii) an approval of the at least one activity,
iv) an approval of an entity where the temporary card to be used,
v) a verification of the at least one activity, or
vi) an establishment of a physical interaction between the computing device and the temporary card;

control the temporary card based on the first and second user-selections; and deactivate the temporary card when the time period has expired, the at least one activity is completed, or both.

In some embodiments, the present disclosure also provides exemplary technically improved computer-based systems, computer-implemented methods, and computer-readable media, including media implemented with and/or involving one or more software applications, whether resident on computer devices or platforms, provided for download via a server and/or executed in connection with at least one network that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
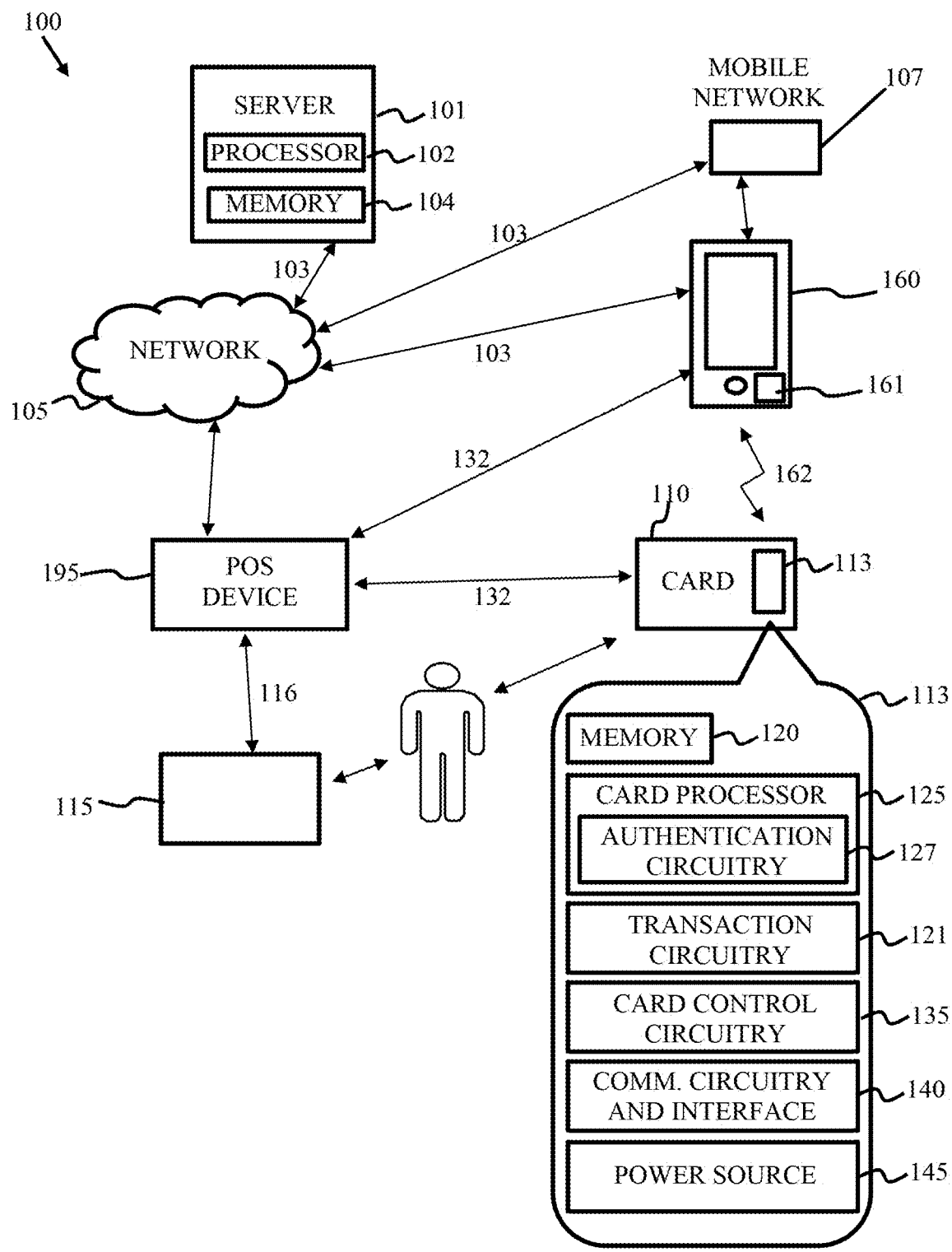
FIG. 1 is a block diagram of an exemplary system and/or platform involving features of temporary card based activities, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In some embodiments, the term "temporary card" can refer to an electronic card with at least one embedded microprocessor. In other embodiments, a "temporary card" herein may instead constitute a virtual or computer-based representation of a user account or virtual transaction card, referred to herein as a "virtual card," i.e., associated with a database record or plurality of financial accounts belonging to the user. In such virtual card embodiments, information regarding such virtual card may be stored on one or more servers and/or various client and/or mobile devices of the user. In operation of such virtual cards, a user may manually enter the account number associated with the temporary card during a transaction at a merchant, the user may capture or display an image of the virtual temporary card using an image sensor or display of a client device (e.g., smartphone, etc.), or other computing components or software involved in the transaction may extract the card data via use of various codes or second-factor authentication techniques. In some embodiments, a virtual card may be stored in an electronic wallet associated with a user device, such as a smartphone or other mobile device. In some embodiments, card data stored on a user device or transmitted via such user device may be encrypted using encryption techniques to provide an additional layer of security.

In embodiments where the temporary card is comprised of a physical card with at least one embedded microprocessor, the temporary card may be dimensioned and/or be utilized such as, but not limited to, a conventional credit or debit card issued to account holders by banks and other financial institutions. In some embodiments, the temporary card may be dimensioned and/or be utilized such as, but not limited to, personal identification cards, health entitlement cards, store loyalty cards, stored value cards (electronic purses), information storage cards, and the like. In some embodiments, the temporary card may be dimensioned, but not limited to, in accordance with international standard ISO/IEC 7810, ID-1 format, which specifies dimensions of 85.60 mm ($85.60 \times 10^{-3}$ m) long by 53.98 mm ($53.98 \times 10^{-3}$ m) wide. In some embodiments, the temporary card may be dimensioned, but not limited to, in accordance with international standard ISO/IEC 7813 further specifies the thickness as 0.76 mm ($0.76 \times 10^{-3}$ m). For example, the temporary card may be made of a plastic material, metal or similar material, and may have convenient dimensions of or within 7.5 cm by 11 cm, or otherwise similar to or dimensioned to fit within a common or known wallet size.

According to some embodiments, the temporary cards and other innovations herein may be implemented in connection with a financial service entity that provides, maintains, manages, or otherwise offers financial services. Here, for example, the financial service entity may be a bank, credit card issuer, or any other type of financial service entity that generates, provides, manages, and/or maintains financial service accounts that entail providing a temporary card for one or more customers, such as a temporary card for use at a POS device or with an online entity for an online purchase or transaction that involves or is associated with such financial service entity. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary system 100 associated with use of a temporary card by an individual, in accordance with one or more embodiments of the present disclosure. System 100 may include a server 101, a mobile device 160, a temporary card 110 with circuitry 113 disposed therein, a regular transaction card 115, and a point-of-service or point-of-sale (POS) device 195, which may all communicate 103 over a communication network 105. After a user is provided with a temporary card and attempts a transaction with the temporary card, the business or merchant associated with the POS device 195 and typically a financial institution, such as a credit card company that has issued the card to the user, may wish to determine or verify whether the user using the credit card is the authorized user in order to approve the transaction. Some embodiments herein may also leverage the fact that the user of the temporary card may most likely carry or is near to the user's mobile device, such as a cellphone, tablet or smartphone, for example, and may use functionality associated with the user's mobile device and the temporary card, including interaction between the two, as a part of various fingerprint activation and/or authentication processes for approving a transaction and/or authorizing the user to use the temporary card to purchase goods or services.

In some embodiments, server 101 may be associated with one or more entities that are stakeholders to the attempted transaction, such as the business or merchant, one or more financial services providers, such as an issuer of a credit card, debit card, or other temporary card associated with the attempted transaction.

In some embodiments, temporary card 110 may include various circuitry 113 including circuitry capable of communicating 132 various card-related information from the temporary card 113, via the POS device 195 or other devices (e.g., mobile device 160) or networks, to one or more computer systems, such as a server 101 and/or other computers associated with handling card transactions and/or managing operation of the temporary card.

It is noted that the disclosed temporary cards, systems, platforms, methods, and computer-readable media include or involve temporary card activation features that may include and/or involve various computing systems and/or components configured to perform various automated functionality set forth herein. Unlike existing solutions using conventional/regular transaction cards, the present innovations may utilize an improved temporary card 110 that may, via programmed operation, activation and deactivation aspects, and/or various other usage controls, provide improved features for operating the temporary card as well as authenticating and/or validating the transaction. In these and other ways, implementations involving the present temporary card and associated features, and functionality based on such temporary cards represent improvements over existing fraud prevention cards and techniques.

Turning back to FIG. 1, server 101 may comprise at least one processor 102 and various non-transient computer readable media that store and/or execute instructions related to managing operation of the temporary card, such as memory 104, which may include random-access memory (RAM). In some embodiments, server 101 may be operated by the financial institution issuing the temporary card, by the merchant, and/or by any transaction clearing house used for authorizing the credit card for use.

With regard to the disclosed technology, the temporary card 110 is provided to a user to conduct purchase transactions for a temporary period of time and/or with other proscribed usage restrictions. Here, for example, the temporary card may be configured for a period of temporary use while the user is travelling, e.g., defined by a start date and an expiration date corresponding to a known duration of the user's travel. According to some embodiments, one or more computers, such as server 101 may be configured to manage operation of the temporary card, either alone or in conjunction with other computing devices, such as a mobile device 160 associated with the card owner. In various embodiments, the server 101 may be configured to: communicate with an app resident on a computing device associated with the user; instruct the app to generate one or more graphical user interfaces (GUIs); control the temporary card based on a first and second user-selections; and deactivate the temporary card when the time period has expired. In some embodiments, one or more graphical user interfaces (GUIs) may comprise a card control panel for the temporary card.

Here, for example, as set forth in more detail in connection with FIG. 3, below, the one or more graphical user interfaces (GUIs) may be configured to display: (i) first interactive GUI elements that enable a user to select first criteria; and (ii) second interactive GUI elements that enable the user to select second criteria. In some embodiments, the first criteria may include one or more of: the time period of approved use; and/or at least one location or geographic region of approved use. In some embodiments, the second criteria may include criteria related to one or more of approval of card use and/or operation, approval of transactions, approval of merchants, verification of transactions, and/or establishing a physical interaction between the mobile device and the temporary card. Various embodiments herein may be configured such that the second criteria may further include one or more of a threshold transaction amount, specific merchants that are approved or un-approved, categories of products and/or services that are approved or un-approved, and/or other criteria that may be presented to and/or provided by the account or card owner. According to certain implementations, the physical interaction may comprise one or more of establishing presence of the temporary card at the mobile device via contactless wireless interaction, establishing presence of the temporary card at the mobile device via contact or touch (tap), and/or capturing or scanning an image of the temporary card, such as via a camera of the mobile device 160.

According some embodiments, the temporary card may comprise circuitry that is configured to deactivate the temporary card at the expiration date defining an end of the time period that the user is travelling. In some embodiments, the temporary card may include electronic circuitry and/or components configured to: (i) detect that the temporary card is in proximity to either of a mobile computer device of the user or of a main (non-travel) temporary card of the user; and/or (ii) activate the temporary card upon detection of the proximity.

Further, according to some embodiments, the temporary card my comprise a payment token comprising information corresponding to one or more of: a card number, a card verification value (cvv) (or other security) code, a card expiration date, an address, a card holder name, an indicator of whether the payment token is for a single use or multiple use, an indicator of a number of use of the payment token, a spending limit per transaction of the payment token, a permissive category list of the payment token, a restricted category list of the payment token, a permissive merchant list of the payment token, an exclusion list of the payment token, an inclusive list of the payment token, and a geo-limit of the payment token.

According to other embodiments, the temporary card may include a communication component, such as a wireless communication component, configured to couple the temporary card to the mobile device, or to another device of the use. In some embodiments, the temporary card may comprise circuitry configured to process a geo-location received from the user device, which may be utilized to confirm authorized use of the temporary card, to confirm an approved action or activity (e.g., use of the card to reserve a room, rental car, etc.), and/or to confirm transactions made by the temporary card.

According to various embodiments, computer readable media associated with server 101 may further comprise instructions that, when executed by at least one processor of the server, cause the server to perform steps including: notifying the user, via the app, of an attempted transaction that was attempted using card information of the temporary card; providing to the user, via the app, third interactive GUI elements that the user selects to indicate the user's verified approval of the attempted transaction; and authorizing, in response to receipt of the verified approval from the user, the attempted transaction. In some embodiments, the third interactive GUI elements may be implemented and enabled at the temporary card control panel 300 of FIG. 3, as set forth in more detail, below.

In some embodiments, the server is further configured to provide the mobile app to the mobile computing device for installation. In other embodiments, the server is configured to automatically deactivate the temporary card upon detecting that the user returns to, for example, a designated, known or established location of the user at which a temporary card is no longer in need (here, for example, such location may be the primary residence of the card owner, though any other location may be agreed-upon or set, e.g., by means of GUI, etc.). The temporary card may also be automatically deactivated, via the server or other involved processing components or circuitry such as the mobile app, the card itself, or the like, when a location, use, and/or other detected occurrence related to the temporary card triggers or fulfills some other condition that was programmed into the operating control of the temporary card.

According to embodiments herein, temporary card 110 may be formed from plastic, metal, or any other suitable material. Temporary card 110 may include card circuitry 113 formed directly therein, and/or disposed therein by gluing, bonding or by any suitable adhesion method for affixing circuitry to the material of temporary card 110. Card circuitry 113 may be configured to utilize any hardwired circuitry. Card circuitry 113 may be implemented as one or more integrated circuit chips, and/or electronic devices, electrically interconnected and bonded to one or more circuit boards, for example. Further details and embodiments of exemplary temporary cards are shown and described in connection with FIG. 2, below.

Referring to FIG. 1, card circuitry 113 may include a memory 120, at least one processor 125, transaction circuitry 121, authentication circuitry 127 (which may be coupled with or separate from the processor 125), communication circuitry and interface 140, and, optionally, a power source 145. Transaction circuitry 121 may comprise various electronic circuitry and/or components, including, in some embodiments, an embedded processor. Memory 120 may store code, such as code used by the authentication circuitry 127, the card control circuitry 135, and the like, which when executed by processor 125 may cause processor 125 to verify and transmit data to the server or other computers and/or to the POS devices or other processors, and/or for other, related schemes herein (such as pairing with mobile device 160), i.e., to control and manage operation of the temporary card herein. As set forth in more detail, below, such features provide means to verify whether or not transactions and users of the temporary card 110 are authorized, e.g., to approve transactions when the user attempts to use the temporary card to purchase goods and/or services, online, at POS devices, etc.

In some embodiments, temporary card 110 may include memory 120, card processor 125, transaction circuitry 121, card control circuitry 135, communication circuitry and/or communication interface 140, and/or power source 145 as separate subcomponents which may be connected via respective electrical connections, as shown, or various of such elements may exist or be integrated as combinations. In general, card control circuitry 135 refers to circuitry configured for controlling operation and functioning of the card, and transaction circuitry refers to circuitry configured for performing transactions (such as financial transaction) between the card and other devices or systems. However, again, it should be understood that such circuitry may also be implemented as a single component. The communication circuitry and/or communication interface 140 may include a computer bus, electrical components or circuitry configured for communication via contact or contactless interconnections, various circuitry for the wireless communication features described elsewhere herein, and the like.

In some embodiments, transaction circuitry 121 may be configured to conduct purchase transactions with the card 110. For example, such purchase transactions may involve one or more of: i) a wireless computing device, such as mobile device 160, that is in a wireless communication with the temporary card; ii) an entity associated with each respective transaction; and/or iii) a server associated with a provider of the card 110. In one embodiment, the transaction circuitry may include the one or more components that are configured to conduct transactions involving a point of sale (POS) device. In some embodiments, the transaction circuitry may further comprise one or more of: an EuroPay-MasterCard-Visa (EMV) chip, an EMV processor, wireless, near field communication (NFC), and/or Bluetooth communication chips/circuitry, or other financial transaction circuitry known in the art.

In some embodiments, card control circuitry 135 may be configured to operationally coupled to one or more of: the transaction circuitry 121, and/or the communication circuitry 140. According to various examples, the card control circuitry 135 may be configured to control one or both of the transaction circuitry 121 and the communication circuitry 140 based on various instructions and/or functionality provided via the server 101, such as aspects of the card control interface shown in FIG. 3.

In some embodiments, the communication circuitry 140 may comprise one or both of: one or both of a near field communication (NFC) circuit and a Bluetooth communication circuit. In one embodiment, the card control circuitry may be further configured to turn on or off the Bluetooth circuitry such that the card 110 is or is not detectable by nearby Bluetooth devices.

In some embodiments, power source 145 may be used to power card circuitry 113. Power source 145 may include, for example, a battery, a solar cell, and/or any suitable energy harvesting device, e.g., capable of generating power to power card circuitry 113 and/or other card functionality. In other embodiments, the temporary card may be powered upon swiping or inserted the card into a slot in POS terminal 195 such that the power source may be POS terminal 195 itself or any other device into which the temporary card is swiped or inserted. The temporary card 110 may also be powered by movement, or by induction, or by other near-field electromagnetic energy derived from nearby sources, such as mobile device 160, POS device 195, or other known sources. Once powered, the temporary card may commence processing consistent with monitoring and managing whether the card is within its established parameters of use.

Mobile device 160, such as a smart phone or other portable or wearable electronic device, may include mobile device circuitry 161. Mobile device circuitry may include a mobile device processor, a memory, such as RAM, communication circuitry and interface, and any input and/or output device, such as a touchscreen display. RAM may store code that, when executed by processor, may cause processor to implement aspects of one or more temporary card operation/control schemes herein, including those involving pairing with temporary card 110, e.g., to verify if a user of the temporary card 110 is an authorized user of the card, to provide control or other information from the mobile device 160 to the temporary card 110, and so on. In some embodiments, an application for the temporary card running on mobile device 160, such as an application supplied by the financial institution issuing the temporary card and/or managing transactions/operation of the temporary card user, may include various modules that may transmit information to the POS device, relay information back to the financial institution (e.g., server 101), and communicate with other computing components.

Various embodiments associated with FIG. 1 and related disclosure herein solve a technical problem of ensuring that a temporary card is only activated for use by the authorized user of the temporary card, e.g., the account owner, and/or authorized users. Various features and functionality disclosed herein may be utilized in connection with fraud prevention and/or authentication processes that involve pairing of temporary card 110 with mobile device 160 when implementing multi-factor authentication (MFA) schemes, for example to authorize the card for use by the user. In other embodiments, various information and/or control(s) derived via pairing of the temporary card and the mobile device may be relayed back to server 101 (e.g., server processor 102) so as to control operation of the card, approve or manage transactions regarding goods and/or services with the authenticated user's temporary card, and the like.

In some embodiments, an initial authentication for pairing the temporary card 110 with the mobile device may be implemented by the user contacting the financial institution from the user's mobile device to initially authorize the pairing of temporary card 110 with mobile device 160 so as to receive pairing approval. In other embodiments, the pairing and/or unpair processes between the temporary card and the mobile device may occur automatically and seamlessly such as without any action on the part of the user, particularly if the same mobile device had been previously paired with the same temporary card in the past. In yet other embodiments, proximity MFA may use biometrics (such as fingerprint, face or voice recognition, etc., e.g., via the mobile device 160) and/or a password entered by the user and/or a swiping of the mobile device screen by a finger of the user and/or the proximity of the temporary card to the mobile device or any client device, for example, to pair or unpair the temporary card with a computing device of the card owner.

In some embodiments, when the temporary card may include a battery as power source 145, the temporary card and the mobile device may be configured to pair with the temporary card on the fly and download/process control information or instructions, e.g., when the temporary card begins to be used for a transaction, which can help prevent fraudulent use and conserve power stored in the battery, among other advantages.

In some embodiments, if the temporary card is determined to be in possession by an unauthorized individual via implementations herein, e.g. at the card 110, at/via POS device 195, an entity associated with the transaction, such as the merchant deploying the POS terminal 195, may generate or receive an alarm or alert that the card user is potentially unauthorized (e.g., an alert on a display of POS terminal 195) or that additional authentication, such as second-factor authentication, should be performed to verify that the user is an authorized user and/or the transaction is otherwise not fraudulent.

Figure 2:
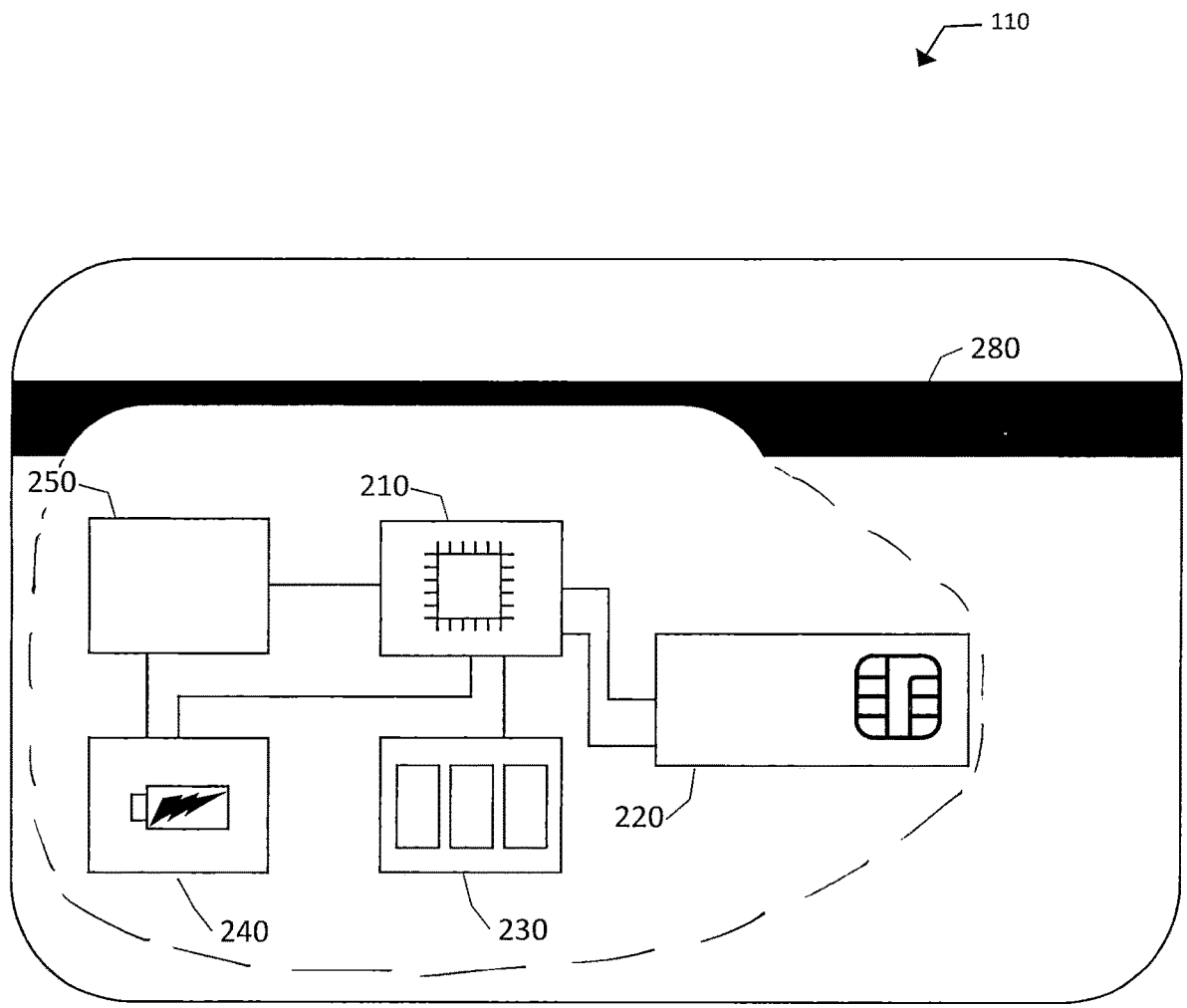
FIG. 2 is a diagram of an exemplary temporary card, consistent with exemplary aspects of certain embodiments of the present disclosure.

FIG. 2 shows a diagram of an exemplary temporary card 110, consistent with disclosed embodiments. In some embodiments, temporary card 110 may be the approximate size and shape of a traditional credit card, debit card, or the like. Temporary card 110 may have embedded electronics for performing various aspects of the disclosed innovations. As shown, temporary card 110 may include at least one processor 210 or processing circuitry, memory 230, power source or power circuitry 240, communication circuitry/devices 250, a magnetic stripe 280, and other coupling circuitry 220 such as an electronic chip element and associated interconnects. Power source or power circuitry 240 may include elements that generate power for the card upon coupling to a POS device, such as by connection via an electronic chip, and/or such circuitry may include a voltage supply such as a battery. In some embodiments, temporary card 110 may include more or fewer components than shown in FIG. 2.

Processor 210 may comprise one or more known or specialized processing devices, of sufficient size and form factor to fit within temporary card 110 when configured to be about the size of a traditional credit or debit card. In some embodiments, processor 210 may include any configuration capable of performing functions related to the technology and aspects described in connection with the temporary cards herein. Processor 210 may also control power source 240, send and receive data, read data from and write data to memory 230, share and process data with the communication circuitry/devices 250, process information or instructions associated with the coupling circuitry 220, and any other functions consistent with the disclosed embodiments.

Power source 240 may include a power storage device such as a battery or capacitor, a power receiver such as an inductive power coil or a wireless power receiver, a power generator such as a solar or kinetic power generator, or any combination thereof. In some embodiments, power source 240 may include one or more other known devices capable of generating, receiving, and/or storing electrical energy.

Memory 230 may include volatile or non-volatile, magnetic, semiconductor, or other type of storage elements and/or tangible (i.e., non-transitory) computer-readable medium that stores relevant instructions and data, such as information needed for or associated with authorizing use of the card, conducting card transactions, and/or other operation/control functionality set forth herein. In some embodiments, the memory 230 may be utilized to store activation and/or control information associated with the temporary card 110, such that the temporary card 110 may, itself, be operable (such as when a transaction is attempted) to communicate data related to whether or not the card is activated, whether or not an attempted transaction is approved or disallowed, whether or not other criteria such as geolocation (e.g., determined via handshake with a POS device, etc.) are satisfactory to proceed with a transaction. Such information may be communicated via operation performed via the communication circuitry/devices 250 and/or the other coupling circuitry 220. In one embodiment, for example, such operations may comprise transmitting, when a purchase transaction is attempted status information to the POS terminal, where status information may include information such as a status of the card, e.g., identifying whether the temporary card 110 is inactive (or active), and/or otherwise falling outside of (or within) the various parameters that may be specified regarding activation and/or approved use of the temporary card 110.

In some embodiments, temporary card 110 may include at least one magnetic stripe 280 or other magnetic communication medium that may share or read magnetically-stored information. In some embodiments, magnetic stripe 280 may be controlled by processor 210. For example, processor 210 may write, clear, and rewrite magnetic stripe 280, to provide particular account information.

In some embodiments, temporary card 110 may include communication circuitry/devices 250 such as antennae and/or NFC (near-field communication) circuitry, for transmitting and/or receiving data from one or more external locations. Communication circuitry 250 may comprise a short-range wireless transceiver, or a near-field communication (NFC) chip. Communication circuitry 250 may be configured to communicate with mobile device 160, a contactless card reader associated with the POS device 195, other systems, and/or other sensors configured to detect the presence of temporary card 110. In other embodiments, communication circuitry/devices 250 may comprise Bluetooth circuitry for processing Bluetooth communications. In one example, the Bluetooth circuitry may comprise at least one Bluetooth antenna configured for Bluetooth low energy (BLE) communication. In another example, communication circuitry/devices 250 may comprise RFID communication circuitry.

In some embodiments, the communication circuitry/devices 250 may include one or more location determining circuitry and/or sensors that are capable of detecting the environment, and especially the geolocation, based on detectable interactions with nearby or connected devices (e.g., by Bluetooth, other near field communications, wireless, etc.) to provide a confirmation or warning that the temporary card 110 is within, or outside of, the geographic area within which it is authorized to operate.

The temporary card may, optionally, also include a display or indicator, which may comprise a screen, indicator light, or other appropriate device for displaying a status or message to user. In some embodiments, display may include a small LCD screen, e-ink screen, or OLED display or one or more LEDs. In some embodiments, display may provide notifications, prompts, and/or messages to user, such as information related to whether or not the temporary card 110 is activated for use.

Figure 3:
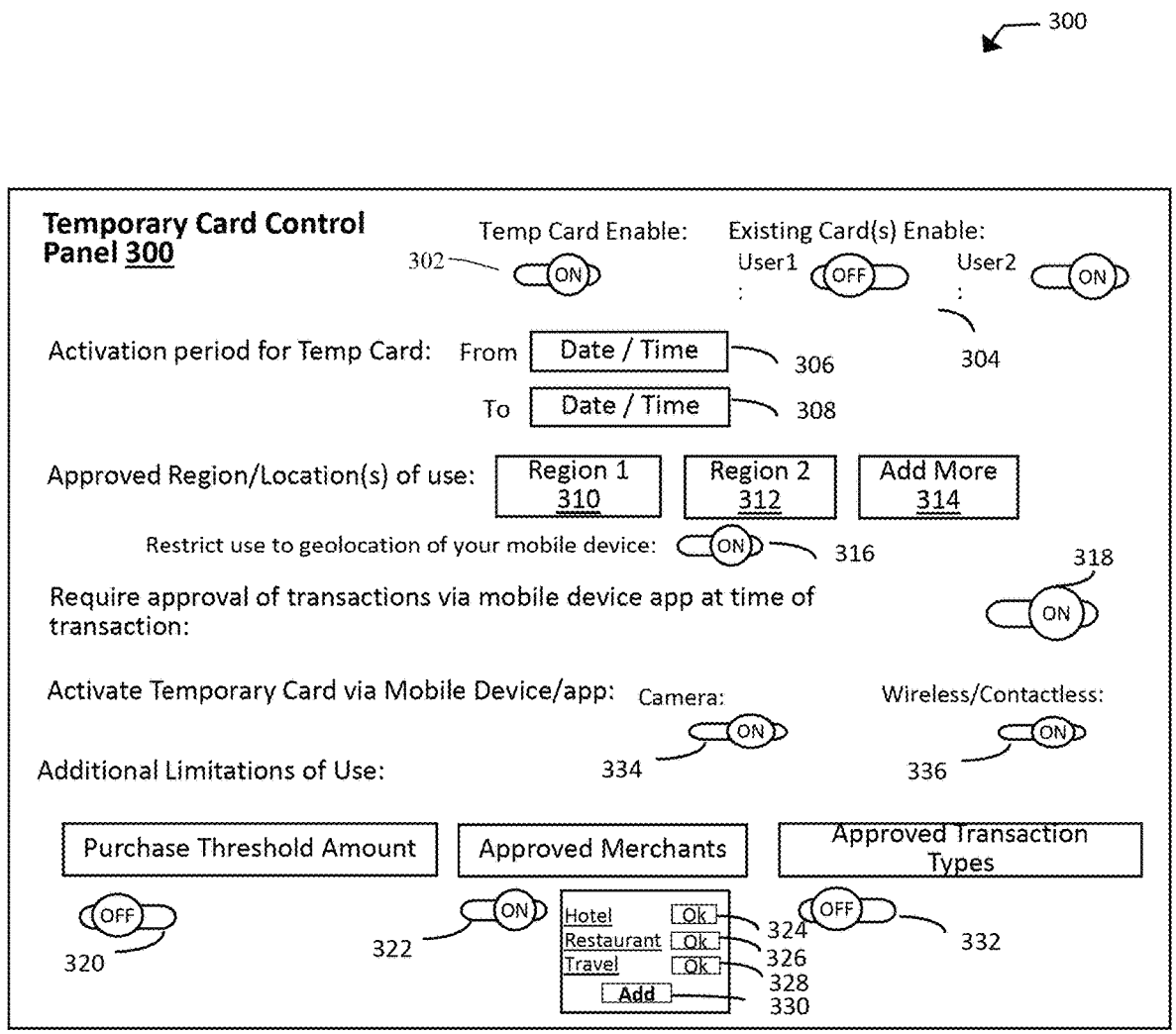
FIG. 3 is a diagram of certain illustrative aspects of an exemplary graphical user interface (GUI) for operating, managing and/or controlling a temporary card, consistent with exemplary aspects of certain embodiments of the present disclosure.

FIG. 3 is a diagram of an example control panel for a temporary card, e.g., for managing a temporary card by a temporary card system, consistent with exemplary aspects of at least some embodiments of the present disclosure. In various embodiments, the temporary card system and such control panel may be implemented by one or more of the server 101 of FIG. 1, a computing device associated with the card owner, and/or a mobile device 160 associated with the card owner, among other components.

In FIG. 3, the temporary card control panel 300 includes a plurality of GUI elements that enable a user of a temporary card to control and manage various aspects of the activation, usage, security, and deactivation of the temporary card. For example, the temporary card control panel 300 may include one or more GUI elements (which may be selectable elements, toggle switches, or the like) that allow the user specify activation and/or control of the temporary card. While the temporary card may also be controlled at other/higher levels based on specified conditions of use, for example, whether present at or away from a location (e.g., primary residence, etc.), specified time period, and the like, various GUI-based control features may be provided for any parameters that the card owner may wish to control. Further, such GUI-based control panels may be utilized regardless of the form factor that the temporary card is delivered, physical card, digital card, token, or the like. Referring to FIG. 3, an example control panel 300 may be provided with one or more GUI elements including a first GUI element or toggle 302, with which the user may interact, via the GUI, to turn the temporary card OFF or ON. In some embodiments, operability of toggle 302 is configured based on a location of the user. In one example, toggle 302 is enabled for the user to interact with when it is detected that the user is at or away from a specified location or region, e.g., primary residence, etc. In another example, toggle 302 is enabled for the user to interact with based on whether or not the user is at a location corresponding to the itinerary information known by or provided to the server or system. Further, the one or more GUI elements may also include, at 304, a second GUI element or toggle that allow the user to specify whether to disable a main (non-travel, non-temporary) card of the user. Here, for example, the user may interact with toggle switches, at 304, to control an activation status of the main cards associated with one or more users, e.g. user 1 and user 2 shown here, as a card owner may frequently wish to deactivate such main cards, however he or she may not wish to do so in all circumstances. As shown in exemplary fields 302 and 304 of FIG. 3, the control panel 300 reflects that the card owner has specified that the temporary card is enabled for use, that a main card associated with user 1 is disabled for use, and that a main card associated with user 2 is enabled for use.

Referring to FIG. 3, the control panel 300 may also include GUI elements that allow the user to further control the activation of the temporary card by specifying a period of time associated with the activation of the card. As shown herein, the user may interact with Date/Time GUI elements, e.g., to set a start date/time, at 306, and to set an expiration date/time, at 308, to specify such period of time. In some embodiments, the period of time may correspond to a period of temporary use during a time period that the user is travelling, including the start date and the expiration date corresponding to the time period that the user is travelling.

According to embodiments herein, the control panel 300 may include GUI elements that allow the user to further control the activation of the temporary card by specifying one location or geographic region of approved use in association with the activation of the temporary card. As shown in FIG. 3, for example, the user may interact with: one or more elements of a first GUI selection, at 310, to select a first region ("Region 1") in which the temporary card is authorized for use, one or more elements of a second GUI selection, at 312, to select a second region ("Region 2") in which the temporary card is authorized for use, and so forth. Further, the control panel 300 may also display one or more buttons or options for the user to "Add More" locations, at 314, i.e., to provide one or more additional locations or geographic regions in which the temporary card is approved for use.

In some embodiments, the control panel 300 may further include a GUI element to allow the user to control an approved location/geo-region by leveraging knowledge of a geolocation of a mobile device associated with the user. As shown in FIG. 3, here, the control panel 300 may include a GUI element, such as a toggle switch 316, by which the user may restrict the use of the temporary card based on a determined geo-location of the user's mobile device, e.g., to a geo-location detected by the mobile device 160 and provided to the server 101. In doing so, the temporary card is associated with the mobile device (or another device) of the user; and a geo-location of such device is determined and processed to confirm that a use, action and/or transactions made by the temporary card was made within a specified location or region of authorized use.

In some embodiments, the control panel 300 may further include a GUI element, selection of which requires the user to provide a second-factor authentication (2FA) to approve a transaction, merchants, or use as being verified. In one embodiment, the control panel 300 may include a GUI element or toggle switch, at 318, to allow the user to turn on such approval control(s). Here, for example, selection of such GUI element in the control panel 300 may initiate a requirement, for example, that the card owner confirm a message sent to an app on a mobile device associated with the user, to authorize any transactions and/or transaction types specified via the control panel 300.

In some embodiments, the control panel 300 may further include a GUI element to allow the user to specify additional limitations on the use of the temporary card. Here, for example, the control panel 300 may provide another GUI element or toggle, at 320, with which the user may interact to specify whether to turn on a feature that automatically disapproves any transaction exceeding a threshold amount, which may also be provided or edited via an associated GUI element. Additional GUI element(s) may also be provided via the control panel, 322 through 330, to specify whether to turn on a feature that automatically approves/disapproves transactions based on the categories of merchants that are approved for the temporary card. In the embodiment shown, here, for example, when such feature for approving merchants is turned ON, at 322, the user may also then be provided with selections (e.g., buttons 324, 326, and 328 or the like) corresponding to various merchants and/or merchant categories that are approved or unapproved, such as "Hotel," "Restaurants," and "Travel." Further, an "Add" button may be provided for the user to select to add one or more categories of merchants to the list, e.g., as another approved merchant. The user may also interact with another GUI element or toggle switch, at 332, to specify whether to turn on a feature for approving and/or disapproving transaction types, e.g., as a function of the categories of products and/or services that are approved or disapproved for purchase via the temporary card.

In some embodiments, the control panel 300 may further include a GUI element to allow the user to control establishment of a physical interaction between the mobile device and the temporary card. Here, in one example, the control panel 300 may be provided with a GUI element or toggle, at 334, to specify whether a camera of the mobile device 160 is to be used to establish or provide a physical interaction between the mobile device and the temporary card, such as to capture a scan of the temporary card for sending to the server to confirm receipt and activate such card. In one example, such physical interaction is established upon capturing an image of the temporary card via a camera of the mobile device. Also shown in FIG. 3, the control screen 300 may be provided with another GUI element or toggle, at 336, with which the user interacts to specify whether a wireless/contactless interactions are to be used to establish the physical interaction between the mobile device and the temporary card. Here, for example, such wireless/contactless physical interaction may be established to enable the temporary card to establish its presence at the mobile device 160 of the user via one or both of contactless wireless interaction (pairing, Bluetooth, etc.) and/or via touch (tap) or other such contact.

Figure 4:
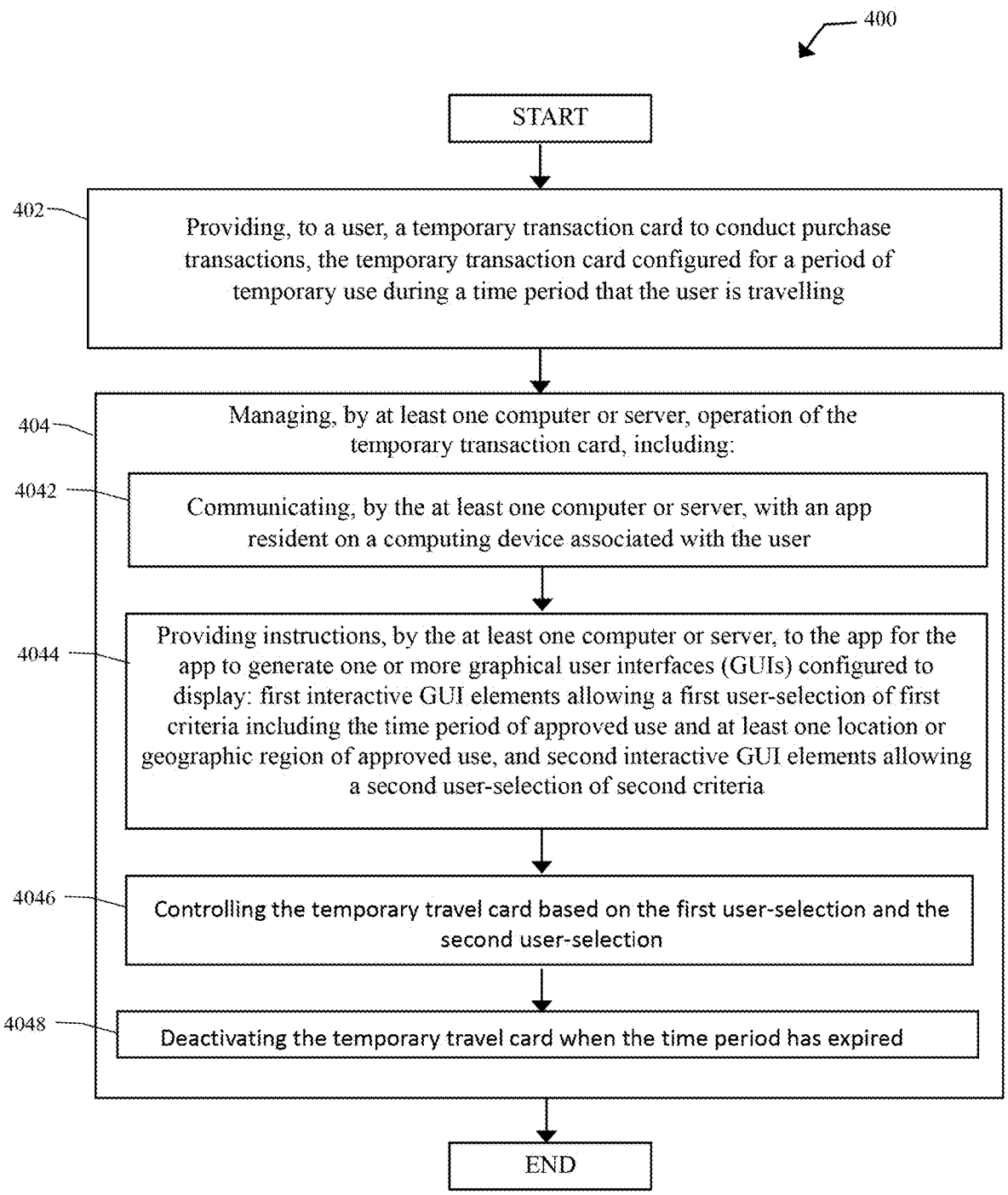
FIG. 4 is a block diagram depicting an exemplary method for providing a temporary card, in accordance with certain embodiments of the present disclosure.

FIG. 4 is a flowchart illustrating one exemplary process 400 related to providing a temporary card, consistent with exemplary aspects of at least some embodiments of the present disclosure. As shown in the exemplary flowchart of FIG. 4, an illustrative temporary card providing process 400 may comprise: providing, to a user, a temporary card to conduct purchase transactions, the temporary card configured for a period of temporary use during a time period that the user is travelling, at 402; and managing, by at least one computer or server, operation of the temporary card, at 404. Further, the temporary card providing process 400 may be carried out, in whole or in part, online, e.g. via a portal or other network connection, and/or it may be carried out by in conjunction with a temporary card and/or app described above.

In some embodiments, temporary card providing process 400 may include, at 402, a step of providing, to a user, a temporary card to conduct purchase transactions, the temporary card configured for a period of temporary use during a time period that the user is travelling. Illustrative features associated with a temporary card associated with the user may include, for example, activity controlling features illustrated above in connection with FIG. 3. With regard to the disclosed innovations, the temporary card may be a payment token. Here, for example, such payment token may comprise information corresponding to one or more of: a card number; a card verification value (cvv) (or other security) code; a card expiration date; an address; a card holder name; an indicator of whether the payment token is for a single use or multiple use; an indicator of a number of use of the payment token; a spending limit per transaction of the payment token; a permissive category list of the payment token; a restricted category list of the payment token; a permissive merchant list of the payment token; an exclusion list of the payment token; an inclusive list of the payment token; and/or a geo-limit of the payment token. In some embodiments, the time period that the user is traveling may include a start date and an expiration date corresponding to the time period that the user is travelling. In implementations, the step of providing such temporary card may be performed by the at least one computer processor.

According to disclosed embodiments, the temporary card may be a physical card delivered to the user at the primary residence of the user. In some embodiments, the temporary card may be delivered to the user at a location, other than the primary residence of the user, associated with the itinerary of the travel trip of the user. In some embodiments, the temporary card may be delivered to the user at any location specified by the user, including but not limited to a trusted merchant or other trusted entity or location, as known to the card provider.

In some embodiments, temporary card providing process 400 may include, at 404, a step of managing, by at least one computer or server, operation of the temporary card. Various embodiments herein may be configured such that step 404 may comprise: communicating, by the at least one computer or server, with an app resident on a computing device associated with the user, at 4042; and providing instructions, by the at least one computer or server, to the app for the app to generate one or more graphical user interfaces (GUIs) configured to display, at 4044; controlling the temporary card based on a first and second user-selections, at 4046; and deactivating the temporary card when the time period has expired, at 4048.

According to disclosed embodiments, the one or more graphical user interfaces (GUIs) may be configured to display: (i) first interactive GUI elements, allowing the first user-selection of first criteria; as well as (ii) second interactive GUI elements, allowing the second user-selection of second criteria. In some embodiments, the first criteria may include one or more of: the time period of approved use; and/or at least one location or geographic region of approved use. In some embodiments, the second criteria may include criteria related to one or more of: approval of card use and/or operation; approval of transactions; approval of merchants; verification of transactions; and/or establishing a physical interaction between the mobile device and the temporary card. In other embodiments, the second criteria may further include one or more of: a threshold transaction amount; specific merchants that are approved or un-approved; categories of products/services that are approved or un-approved; and/or other criteria that may be presented to and/or provided by the account or card owner.

With regard to the physical interaction between the mobile device and the temporary card, embodiments herein may be configured such that the physical interaction may include one or more of: establishing presence of the temporary card at the mobile device via contactless wireless interaction; establishing presence of the temporary card at the mobile device via contact or touch (tap); and/or capturing an image of the temporary card via a camera of the mobile device.

According to some embodiments, prior to the above-described providing the temporary card to the user, methods herein may also comprise the steps of: receiving a request from the user for an issuance of the temporary card; determining whether a current geo-location of the user matches either the primary residence of the user or a location associated with an itinerary of a travel trip of the user, the itinerary of the travel trip being obtained based on transactions to book the travel trip using a temporary card of the user; and approving, in response to a determined match, the request to provide the temporary card to the user.

According to some embodiments, methods herein may also comprise: notifying the user, via the app, of an attempted transaction that was attempted using card information of the temporary card; providing to the user, via the app, a third GUI including an interactive GUI element that the user selects to indicate the user's verified approval of the attempted transaction; and authorizing, in response to receipt of the verified approval from the user, the attempted transaction.

According to some embodiments, methods herein may also comprise alerting, in response the user noting disapproval of the attempted transaction, one or both of an authoritative agency and an institution issuing the temporary card that a fraudulent transaction is made using the temporary card.

According to some embodiments, methods herein may also comprise: coupling the temporary card with the mobile device or another device of the user; and processing a geo-location from the mobile device or other device to confirm authorized use, action and/or transactions made by the temporary card.

Further according to some embodiments, methods herein may also comprise: detecting that the temporary card is in vicinity of a main (non-travel) temporary card of the user; and activating the temporary card.

Here, it is noted that the disclosed systems, platforms, temporary cards, methods, and computer-readable media include or involve a temporary card management mechanism that may include and/or involve a software application configured to perform various automated functionality set forth herein. Unlike conventional software and solutions, the present innovations may utilize an improved temporary card management mechanism that may, via the use of an app, be configured to manage the activation, deactivation, and transactions involving a temporary card. In these and other manners, implementations involving the software empowered with disclosed temporary card management mechanism represents an improvement over conventional management guarding the use of temporary cards.

The disclosed software improves utilization of both processing and communication resources, such as by allowing a card owner to control properties of a temporary card by specifying, via an app, criteria such as when, where, and how the temporary card can be activated and used, as well as security measures related to the activation and usage of the temporary card. Moreover, the improved software enabled by the disclosed temporary card management mechanisms improves efficiency, accuracy, robustness, autonomousness and security ability of temporary card management; and reduces likelihood of user exposure to frauds involving cards and/or other devices, thereby reducing or eliminating unnecessary and/or inefficient and inaccurate processing related to temporary card fraud.

Figure 5:
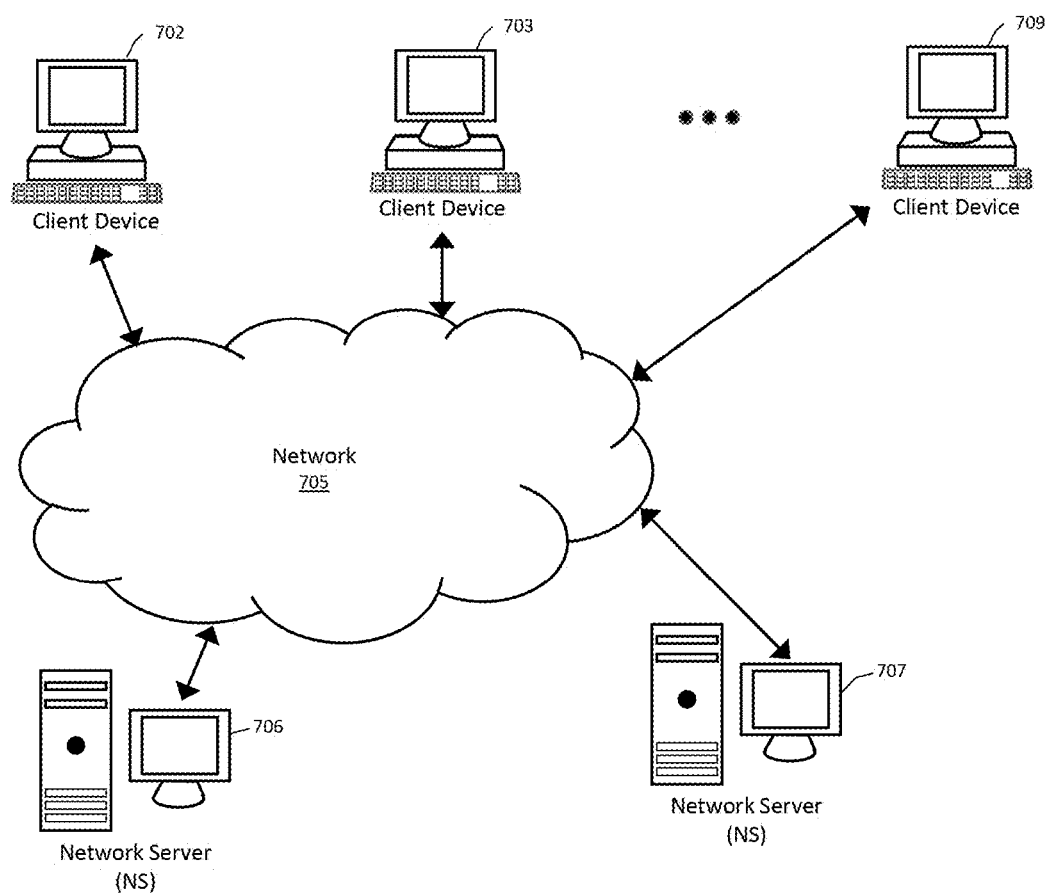
FIG. 5 is a block diagram depicting an exemplary computer-based system and/or platform, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, clients such as client devices 702 through 709 (e.g., POS devices and/or client computing devices, etc.) of the exemplary computer-based system/platform may include virtually any computing device capable of receiving and sending communications over a network (e.g., cloud network, etc.), such as network 705, to and from another computing device, such as servers 706 and 707, each other, and the like. In some embodiments, the member devices 702 through 709 may be POS (point of sale, point of service, etc.) devices, personal computers, multiprocessor systems, microprocessor-based or programmable consumer electronics, network PCs, and the like. In some embodiments, one or more devices within client devices 702 through 709 may include computing devices that typically connect via wired connection and/or wireless communications media such as mobile devices 160, cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more client devices of client devices 702 through 709 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within client devices 702 through 709 may include may run one or more applications, such as Internet browsers, mobile applications, voice calls, video games, videoconferencing, and email, among others. In some embodiments, one or more member clients of client devices 702 through 709 may be configured to receive and to send web pages, and the like. In some embodiments, an exemplary specifically programmed browser applications, such as any associated with online transactions of the present disclosure, may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device of client devices 702 through 709 may be specifically programmed by either Java, .Net, QT, C, C++ and/or other suitable programming language. In some embodiments, one or more client devices within client devices 702 through 709 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, one or both of the exemplary server 706 and/or the exemplary server 707 may be a web server (or a series of servers) running a network operating system, examples of which may include but are not limited to Microsoft Windows Server, Novell NetWare, or Linux. In some embodiments, the exemplary server 706 and/or the exemplary server 707 may be used for and/or provide cloud and/or network computing. Although not shown in FIG. 5, in some embodiments, the exemplary server 706 and/or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the client devices 702 through 709.

In some embodiments and, optionally, in combination of any embodiment described above or below, for example, one or more exemplary client devices 702 through 709, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
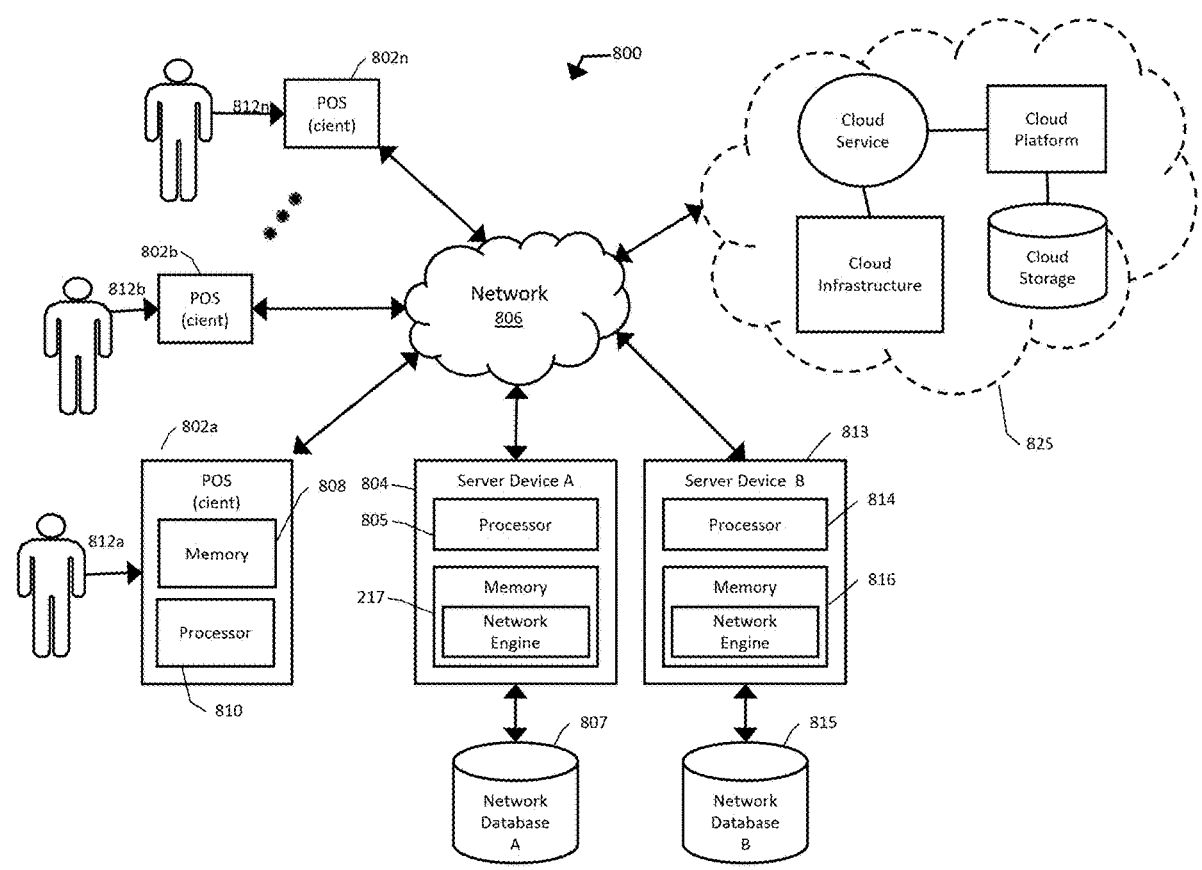
FIG. 6 is a block diagram depicting another exemplary computer-based system and/or platform, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b through 802n shown each at least includes a computer-readable media 808, which may include memory such as random-access memory (RAM), coupled to a processor 810. In some embodiments, the processor 810 may execute computer-executable program instructions stored in media or memory, at 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client device 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806. As shown in FIG. 6, exemplary server devices 804, 813 and, in some embodiments, one or more cloud components 825 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
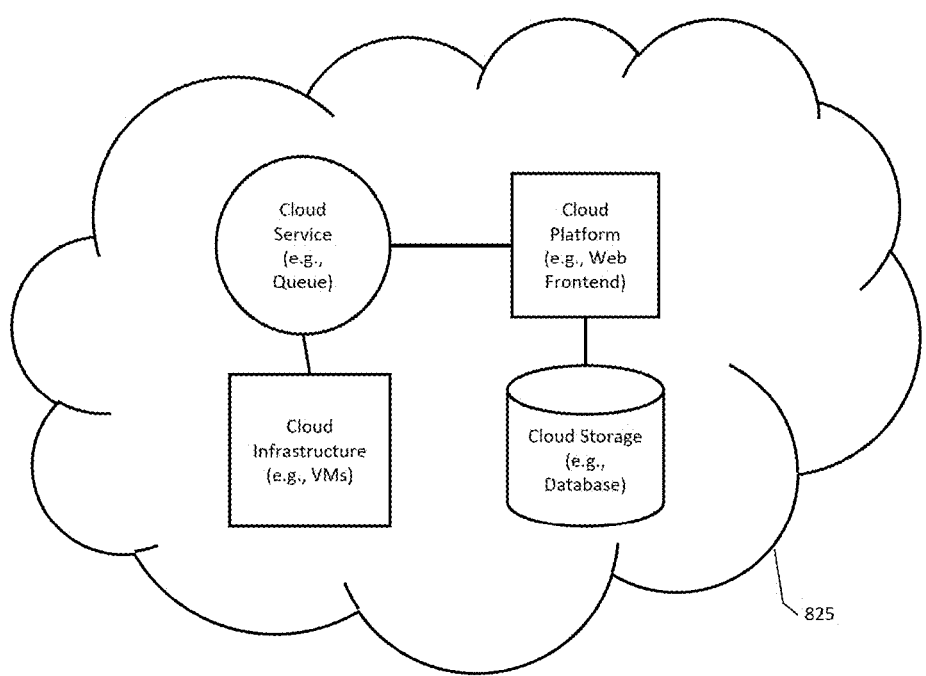
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
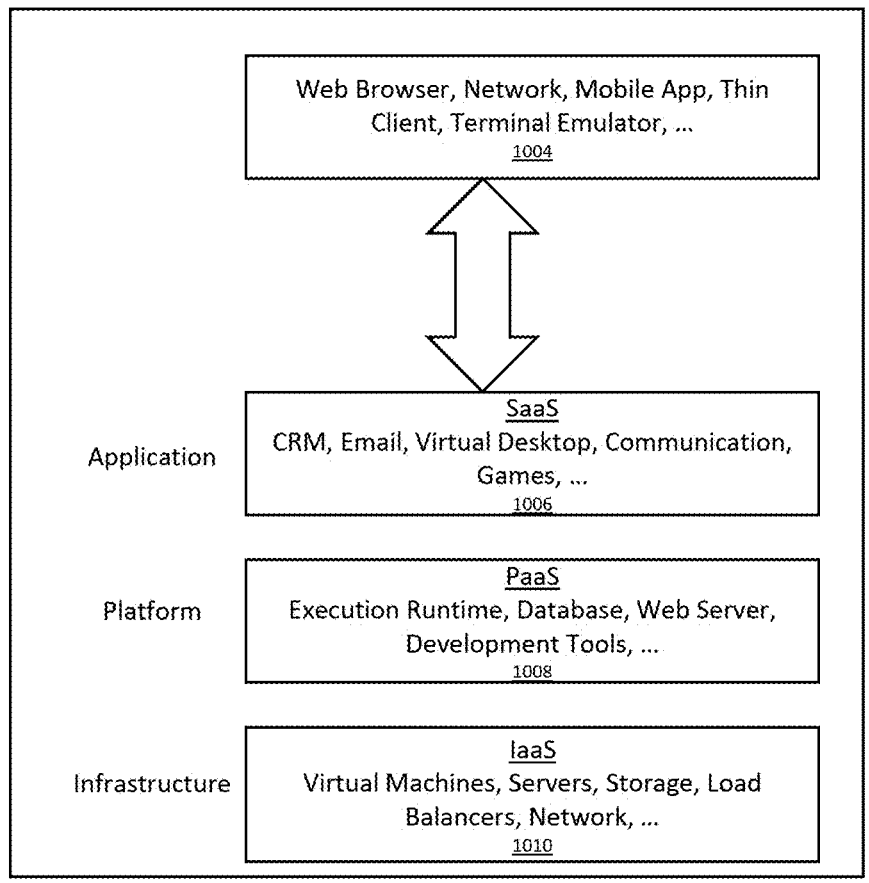

As also detailed further in connection with FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., related to the online service, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIGS. 7 and 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate diagrams of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the network communication aspects, e.g. as shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and the term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., as shown in FIGS. 5-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) Linux, (2) Microsoft Windows, (3) OS X (Mac OS), (4) Solaris, (5) UNIX (6) VM, (7) Android, (8) Java Platforms, (9) Open Web Platform, or other suitable computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation. In some embodiments, the exemplary inventive computer-based systems/platforms, exemplary inventive computer-based devices, and/or exemplary inventive computer-based components of the present disclosure may be configured to utilize a location of an unregistered trusted party as part of the authentication detailed herein.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A system comprising:
a temporary card provided to a user to conduct purchase transactions, the temporary card configured for a period of temporary use during a time period that the user is travelling including a start date and an expiration date corresponding to the time period that the user is travelling; and
a server configured to manage operation of the temporary card, and comprising non-transient computer readable media storing instructions that, when executed by at least one processor of the server, cause the server to:
communicate with an app resident on a computing device associated with the user;
instruct the app to generate one or more graphical user interfaces (GUIs) configured to display:
first interactive GUI elements, allowing a first user-selection of first criteria including: the time period of approved use and at least one location or geographic region of approved use; and
second interactive GUI elements, allowing a second user-selection of second criteria related to one or more of: approval of card use and/or operation, approval of transactions, approval of merchants, verification of transactions, or establishment of a physical interaction between the mobile device and the temporary card;
control the temporary card based on the first and second user-selections; and deactivate the temporary card when the time period has expired.

Clause 2. The system of clause 1 or the innovation(s) according to other aspects herein, wherein the temporary card comprises circuitry that is configured to deactivate the temporary card at the expiration date defining an end of the time period that the user is travelling.

Clause 3. The system of clause 1 or the innovation(s) according to other aspects herein, wherein the temporary card includes electronic circuitry and/or components configured to: (i) detect that the temporary card is in proximity to either of a mobile computer device of the user or of a main (non-travel) temporary card of the user; and (ii) activate the temporary card upon detection of the proximity.

Clause 4. The system of clause 1 or the innovation(s) according to other aspects herein, wherein the computer readable media further comprise instructions that, when executed by the at least one processor, cause the server to:
notify the user, via the app, of an attempted transaction that was attempted using card information of the temporary card;
provide to the user, via the app, third interactive GUI elements that the user selects to indicate the user's verified approval of the attempted transaction; and authorize, in response to receipt of the verified approval from the user, the attempted transaction.

Clause 5. The system of clause 1 or the innovation(s) according to other aspects herein, wherein the physical interaction comprises one or more of: establishing presence of the temporary card at the mobile device via contactless wireless interaction, establishing presence of the temporary card at the mobile device via contact or touch (tap), and/or capturing an image of the temporary card via a camera of the mobile device.

Clause 6. The system of clause 1 or the innovation(s) according to other aspects herein, wherein the second criteria further such as a threshold transaction amount, specific merchants that are approved or un-approved, categories of products/services that are approved or un-approved, and the like.

Clause 7. The system of clause 1 or the innovation(s) according to other aspects herein, wherein the computer readable media further comprise instructions that, when executed by the at least one processor, cause the server to:
provide the mobile app to the mobile computing device for installation.

Clause 8. The system of clause 1 or the innovation(s) according to other aspects herein, wherein the temporary card comprises a payment token comprising information corresponding to one or more of: a card number, a card verification value (cvv) (or other security) code, a card expiration date, an address, a card holder name, an indicator of whether the payment token is for a single use or multiple use, an indicator of a number of use of the payment token, a spending limit per transaction of the payment token, a permissive category list of the payment token, a restricted category list of the payment token, a permissive merchant list of the payment token, an exclusion list of the payment token, an inclusive list of the payment token, and a geo-limit of the payment token.

Clause 9. The system of clause 1 or the innovation(s) according to other aspects herein, wherein the temporary card includes:
a wireless communication component configured to couple the temporary card to the mobile device, or to another device of the user; and
circuitry configured to process a geo-location received from the user device, to confirm authorized use, approved action or activity, and/or transactions made by the temporary card.

Clause 10. The system of clause 1 or the innovation(s) according to other aspects herein, wherein the at least one computer or server is configured to automatically deactivate the temporary card upon detecting that the user returns to the primary residence.

Clause 11. A method comprising:
providing, to a user, a temporary card to conduct purchase transactions, the temporary card configured for a period of temporary use during a time period that the user is travelling, including a start date and an expiration date corresponding to the time period that the user is travelling;
managing, by at least one computer or server, operation of the temporary card, including:
communicating, by the at least one computer or server, with an app resident on a computing device associated with the user;
providing instructions, by the at least one computer or server, to the app for the app to generate one or more graphical user interfaces (GUIs) configured to display:
first interactive GUI elements, allowing a first user-selection of first criteria including: the time period of approved use and at least one location or geographic region of approved use; and
second interactive GUI elements, allowing a second user-selection of second criteria related to one or more of: approval of card use and/or operation, approval of transactions, approval of merchants, verification of transactions, or establishment of a physical interaction between the mobile device and the temporary card;
controlling the temporary card based on the first and second user-selections; and deactivating the temporary card when the time period has expired.

Clause 12. The method of clause 11 or the innovation(s) according to other aspects herein, further comprising:
notifying the user, via the app, of an attempted transaction that was attempted using card information of the temporary card;
providing to the user, via the app, a third GUI including an interactive GUI element that the user selects to indicate the user's verified approval of the attempted transaction; and
authorizing, in response to receipt of the verified approval from the user, the attempted transaction.

Clause 13. the method of clause 11 or the innovation(s) according to other aspects herein, further comprising:
alerting, in response the user noting disapproval of the attempted transaction, one or both of an authoritative agency and an institution issuing the temporary card that a fraudulent transaction is made using the temporary card.

Clause 14. The method of clause 11 or the innovation(s) according to other aspects herein, wherein the physical interaction comprises one or more of: establishing presence of the temporary card at the mobile device via contactless wireless interaction, establishing presence of the temporary card at the mobile device via contact or touch (tap), and/or capturing an image of the temporary card via a camera of the mobile device.

Clause 15. The method of clause 11 or the innovation(s) according to other aspects herein, wherein the first and/or second criteria further includes additional criteria such as: a threshold transaction amount, specific merchants that are approved or un-approved, categories of products/services that are approved or un-approved, additional criteria presented to and/or provided by the account or card owner, and/or other criteria.

Clause 16. The method of clause 11 or the innovation(s) according to other aspects herein, wherein the temporary card is a payment token comprising information corresponding to one or more of: a card number, a card verification value (cvv) (or other security) code, a card expiration date, an address, a card holder name, an indicator of whether the payment token is for a single use or multiple use, an indicator of a number of use of the payment token, a spending limit per transaction of the payment token, a permissive category list of the payment token, a restricted category list of the payment token, a permissive merchant list of the payment token, an exclusion list of the payment token, an inclusive list of the payment token, and a geo-limit of the payment token.

Clause 17. The method of clause 11 or the innovation(s) according to other aspects herein, prior to providing the temporary card to the user, further comprising:
receiving a request from the user for an issuance of the temporary card;

determining whether a current geo-location of the user matches either the primary residence of the user or a location associated with an itinerary of a travel trip of the user, the itinerary of the travel trip being obtained based on transactions to book the travel trip using a temporary card of the user; and approving, in response to a determined match, the request to provide the temporary card to the user.

Clause 18. The method of clause 11 or the innovation(s) according to other aspects herein, further comprising:

coupling the temporary card with the mobile device or another device of the user; and processing a geo-location from the mobile device or other device to confirm authorized use, action and/or transactions made by the temporary card.

Clause 19. The method of clause 11 or the innovation(s) according to other aspects herein, further comprising:

detecting that the temporary card is in vicinity of a main (non-travel) temporary card of the user; and activating the temporary card.

Clause 20. The method of clause 1 or the innovation(s) according to other aspects herein, further comprising:

delivering the temporary card to the user, either at the primary residence of the user, or at a location, other than the primary residence of the user, associated with the itinerary of the travel trip of the user.

Clause 21. A method comprising:

providing a temporary card to a user, the temporary card configured with an expiration date corresponding to a period of time of the user being away from a primary residence of the user, and the temporary card corresponding to another temporary card of the user;

activating the temporary card such that the other temporary card of the user is deactivated;

notifying the user of one or more transactions using the temporary card via an app of a mobile device of the user; and authorizing, in response to a verified approval from the user, the one or more transactions using the temporary card.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A system comprising:

a temporary card provided to a user to conduct at least one activity requiring a presentation of the temporary card, the temporary card configured to be active for a period of a temporary use during a pre-defined time period, wherein the temporary card includes:

a wireless communication component that:
(i) detects that the temporary card is in proximity to a mobile computer device of the user;
(ii) activates the temporary card upon detection of the proximity; and
(iii) couples the temporary card to the mobile computer device; and circuitry configured to process a location received from the mobile computer device, to confirm authorized use, approved action or activity, and/or transactions made by the temporary card;

wherein the mobile computer device is configured to:
(i) receive the location of the mobile computer device provided by a global positioning system (GPS), and
(ii) communicate the location to the circuitry of the temporary card paired with the communication circuitry in the mobile computer device; and a server configured to manage operation of the temporary card, and comprising non-transitory computer readable media storing instructions that, when executed by at least one processor of the server, cause the server to:

communicate with an app resident on a computing device associated with the user;

instruct the app to generate one or more graphical user interfaces (GUIs) configured to display:

first interactive GUI elements, allowing a first user-selection of first criteria including: the pre-defined time period of approved use and at least one location or geographic region of approved use; and second interactive GUI elements, allowing a second user-selection of second criteria related to one or more of:
i) an approval of a use of the temporary card,
ii) an approval or operation of the temporary card,
iii) an approval of the at least one activity,
iv) an approval of an entity where the temporary card to be used,
v) a verification of the at least one activity, or
vi) an establishment of a physical interaction between the computing device and the temporary card;

control the temporary card based on the first and second user-selections; and deactivate the temporary card when the pre-defined time period has expired, the at least one activity is completed, or both.

2. The system of claim 1 wherein the at least one activity comprises a purchase transaction.

3. The system of claim 1 wherein the temporary card comprises circuitry that is configured to deactivate the temporary card at an expiration date defining an end of a time period that the user is travelling.

4. The system of claim 1 wherein the computer readable media further comprise instructions that, when executed by the at least one processor, cause the server to:

notify the user, via the app, of an attempted transaction that was attempted using card information of the temporary card;

provide to the user, via the app, third interactive GUI elements that the user selects to indicate a verified approval from the user of the attempted transaction; and authorize, in response to receipt of the verified approval from the user, the attempted transaction.

5. The system of claim 1 wherein the physical interaction comprises one or more of: establishing presence of the temporary card at the mobile device via contactless wireless interaction, establishing presence of the temporary card at the mobile device via contact or touch, and/or capturing an image of the temporary card via a camera of the mobile device.

6. The system of claim 1 wherein the second criteria further includes one or more of: a threshold transaction amount, specific merchants that are approved or un-approved, and/or categories of products/services that are approved or un-approved.

7. The system of claim 1 wherein the computer readable media further comprise instructions that, when executed by the at least one processor, cause the server to:
provide the mobile app to the mobile computing device for installation.

8. The system of claim 1, wherein the temporary card comprises a payment token comprising information corresponding to one or more of: a card number, a card verification value code, a card expiration date, an address, a card holder name, an indicator of whether the payment token is for a single use or multiple use, an indicator of a number of use of the payment token, a spending limit per transaction of the payment token, a permissive category list of the payment token, a restricted category list of the payment token, a permissive merchant list of the payment token, an exclusion list of the payment token, an inclusive list of the payment token, and a geo-limit of the payment token.

9. The system of claim 1, wherein the temporary card includes:
a wireless communication component configured to couple the temporary card to the mobile computer device, or to another device of the user; and
wherein the circuitry is configured to process the location received from the user device, to confirm authorized use, approved action or activity, and/or transactions made by the temporary card.

10. The system of claim 1, wherein the at least one computer or server is configured to automatically deactivate the temporary card upon detecting that the user returns to a primary residence.

11. The system of claim 1 wherein the pre-defined time period comprises a period of time that the user is travelling including a start date/time and an expiration date/time.

12. The system of claim 1, wherein the temporary card further comprises:
deactivation circuitry that is configured to deactivate the temporary card at an expiration date defining an end of a time period that the user is travelling; and
wherein the wireless communication component is further configured to:
detect that the temporary card is in proximity to a main temporary card of the user.

13. A method comprising:
providing, to a user, a temporary card to conduct purchase transactions, the temporary card comprising:
a wireless communication component that:
(i) detects that the temporary card is in proximity to mobile computer device of the user;
(ii) activates the temporary card upon detection of the proximity; and
(iii) couples the temporary card to the mobile computer device; and
circuitry that:
manages and authorizes use of the temporary card over a period of temporary use during a time period that the user is travelling, including a start date and an expiration date corresponding to the time period that the user is travelling; and
processes a location received from the mobile computer device, to confirm authorized use, approved action or activity, and/or transactions made by the temporary card;
wherein the mobile computer device is configured to:
(i) receive the location of the mobile computer device provided by a global positioning system (GPS), and
(ii) communicate the location to the circuitry of the temporary card paired with the communication circuitry in the mobile computer device;
managing, by at least one computer or server, operation of the temporary card, including:
communicating, by the at least one computer or server, with an app resident on a computing device associated with the user;
providing instructions, by the at least one computer or server, to the app for the app to generate one or more graphical user interfaces (GUIs) that display:
first interactive GUI elements, allowing a first user-selection of first criteria including: a time period of approved use and at least one location or geographic region of approved use; and
second interactive GUI elements, allowing a second user-selection of second criteria related to one or more of: approval of card use and/or operation, approval of transactions, approval of merchants, verification of transactions, or establishment of a physical interaction between the mobile device and the temporary card;
controlling the temporary card based on the first and second user-selections; and
deactivating the temporary card when the time period has expired.

14. The method of claim 13 wherein the at least one activity comprises a purchase transaction.

15. The method of claim 13, further comprising:
notifying the user, via the app, of an attempted transaction that was attempted using card information of the temporary card;
providing to the user, via the app, a third GUI including an interactive GUI element that the user selects to indicate a verified approval from the user of the attempted transaction; and
authorizing, in response to receipt of the verified approval from the user, the attempted transaction.

16. The method of claim 13, further comprising:
alerting, in response to the user noting disapproval of an attempted transaction, one or both of an authoritative agency and an institution issuing the temporary card that a fraudulent transaction is made using the temporary card.

17. The method of claim 13 wherein the physical interaction comprises one or more of: establishing presence of the temporary card at the mobile device via contactless wireless interaction, establishing presence of the temporary card at the mobile device via contact or touch, and/or capturing an image of the temporary card via a camera of the mobile device.

18. The method of claim 13 wherein the first and/or second criteria further includes one or more of: a threshold transaction amount, specific merchants that are approved or un-approved, and/or categories of products/services that are approved or un-approved.

19. The method of claim 13, wherein the temporary card is a payment token comprising information corresponding to one or more of: a card number, a card verification value code, a card expiration date, an address, a card holder name, an indicator of whether the payment token is for a single use or multiple use, an indicator of a number of use of the payment token, a spending limit per transaction of the payment token, a permissive category list of the payment token, a restricted category list of the payment token, a permissive merchant list of the payment token, an exclusion list of the payment token, an inclusive list of the payment token, and a geo-limit of the payment token.

20. The method of claim 13, further comprising:
- deactivating, via deactivation circuitry, the temporary card at an expiration date defining an end of a time period that the user is travelling; and
- detecting, via the wireless communication component, that the temporary card is in proximity to a main temporary card of the user.

* * * * *